United States Patent
Yuan

(10) Patent No.: US 10,878,094 B2
(45) Date of Patent: Dec. 29, 2020

(54) ROOT VIRUS REMOVAL METHOD AND APPARATUS, AND ELECTRONIC DEVICE

(71) Applicant: Beijing Kingsoft Internet Security Software Co., Ltd., Beijing (CN)

(72) Inventor: Guoqing Yuan, Beijing (CN)

(73) Assignee: Beijing Kingsoft Internet Security Software Co., Ltd.

(*) Notice: Subject to any disclaimer, the term of this patent is extended or adjusted under 35 U.S.C. 154(b) by 219 days.

(21) Appl. No.: 16/066,040

(22) PCT Filed: Dec. 26, 2016

(86) PCT No.: PCT/CN2016/112036
§ 371 (c)(1),
(2) Date: Jun. 25, 2018

(87) PCT Pub. No.: WO2017/114341
PCT Pub. Date: Jul. 6, 2017

(65) Prior Publication Data
US 2019/0018963 A1    Jan. 17, 2019

(30) Foreign Application Priority Data
Dec. 31, 2015 (CN) .......................... 2015 1 1031245

(51) Int. Cl.
*G06F 21/56* (2013.01)
*G06F 21/55* (2013.01)
(Continued)

(52) U.S. Cl.
CPC .......... *G06F 21/568* (2013.01); *G06F 9/545* (2013.01); *G06F 21/554* (2013.01);
(Continued)

(58) Field of Classification Search
None
See application file for complete search history.

(56) References Cited

U.S. PATENT DOCUMENTS 8,127,316 B1 * 2/2012 Binotto ................... G06F 9/545
                                                                   719/331
8,572,371 B2 * 10/2013 Gassoway ............. G06F 21/562
                                                                   713/165
(Continued)

FOREIGN PATENT DOCUMENTS

CN        102663285 A        9/2012
CN        102663286 A        9/2012
(Continued)

OTHER PUBLICATIONS

International Search Report dated Mar. 29, 2017 for International Application No. PCT/CN2016/112036 filed Dec. 26, 2016, 4 pages.
(Continued)

*Primary Examiner* — Kambiz Zand
*Assistant Examiner* — Arezoo Sherkat
(74) *Attorney, Agent, or Firm* — McDonnell Boehnen Hulbert & Berghoff LLP

(57) ABSTRACT

Embodiments of the present application disclose a method and apparatus for removing a root-privileged virus, and an electronic device. The method comprises: detecting, according to a preset virus database, whether a smart device has a file with a characteristic of a root-privileged virus; obtaining a system root privilege when a file with the characteristic of the root-privileged virus is detected; terminating all processes corresponding to all the detected files with the characteristic of the root-privileged virus; recovering system startup items to a status before the intrusion of the root-privileged virus; and deleting all the detected files with the characteristic of the root-privileged virus. Compared with the prior art, the embodiments of the present application enable root-privileged viruses to be killed more thoroughly.

9 Claims, 4 Drawing Sheets

(51) Int. Cl.
*G06F 21/57* (2013.01)
*G06F 9/54* (2006.01)

(52) U.S. Cl.
CPC .......... *G06F 21/564* (2013.01); *G06F 21/577* (2013.01); *G06F 2221/2113* (2013.01)

(56) References Cited

U.S. PATENT DOCUMENTS

| | | | | |
|---|---|---|---|---|
| 2003/0159070 | A1* | 8/2003 | Mayer | G06F 21/53 726/22 |
| 2006/0253909 | A1* | 11/2006 | Cherepov | G06F 21/554 726/26 |
| 2007/0022287 | A1* | 1/2007 | Beck | G06F 21/554 713/164 |
| 2012/0304298 | A1* | 11/2012 | Man | G06F 21/568 726/24 |
| 2014/0013434 | A1* | 1/2014 | Ranum | H04L 63/145 726/24 |
| 2015/0264062 | A1* | 9/2015 | Hagiwara | H04L 63/145 726/24 |
| 2017/0316206 | A1* | 11/2017 | Zou | G06F 11/34 |

FOREIGN PATENT DOCUMENTS

| | | |
|---|---|---|
| CN | 102799801 A | 11/2012 |
| CN | 103530559 A | 1/2014 |
| CN | 104008340 A | 8/2014 |
| CN | 105095764 A | 11/2015 |

OTHER PUBLICATIONS

JB51.Net, "How to manually clear the Ghost Push virus? A method for manually clearing the Ghost Push virus.", 2015, 9 pages, http://www.jb51.net/softjc/384029.html.

BBS DUBA.net, "Clear the Ghost Push virus step by step", 2015, 23 pages, http://bbs.duba.net/forum.php?mod=viewthread&tid=23351627.

* cited by examiner

ROOT VIRUS REMOVAL METHOD AND APPARATUS, AND ELECTRONIC DEVICE

The present application is a U.S. national phase application of International Patent Application No. PCT/CN2016/112036, filed Dec. 26, 2016 which claims the priority to a Chinese Patent Application No. 201511031245.1, filed with the State Intellectual Property Office of the People's Republic of China on Dec. 31, 2015 and entitled "METHOD AND APPARATUS FOR REMOVING ROOT-PRIVILEGED VIRUS AND ELECTRONIC DEVICE", which are incorporated herein by reference in their entirety.

TECHNICAL FIELD

The present application relates to the field of system security, and in particular to a method and apparatus for removing a root-privileged virus, and an electronic device.

BACKGROUND

With the continuous upgrading and updating of computer viruses, a virus having the superuser root privilege of a system appears. Such a virus would obtain the root privilege of the system to change system configurations and its own attributes, such that it is very difficult to be removed thoroughly.

In the prior art, in order to kill a root-privileged virus, an anti-virus software needs to first obtain the root privilege, and then kill installation files with the root-privileged virus existing in the system. However, it is difficult to obtain the root privilege of a smart device whose root privilege cannot be available to a third-party software. A virus will generate a specific process to prevent an anti-virus software from deleting it, and will also modify automatic startup items of a system to make it has an auto-start ability, so that the root-privileged virus cannot be killed thoroughly in the prior art.

SUMMARY

The embodiments of the present application disclose a method and apparatus for removing a root-privileged virus and an electronic device, so as to remove the superuser-privileged virus more thoroughly.

To achieve the above objective, an embodiment of the present application discloses a method for removing a root-privileged virus, which is applicable to a smart device. The method includes:
  detecting, according to a preset virus database, whether the smart device has a file with a characteristic of a root-privileged virus;
  obtaining a system root privilege when a file with the characteristic of the root-privileged virus is detected;
  terminating all processes corresponding to all the detected files with the characteristic of the root-privileged virus;
  recovering system startup items to a status before the intrusion of the root-privileged virus; and
  deleting all the detected files with the characteristic of the root-privileged virus.
Preferably, obtaining a system root privilege includes:
  requesting the system root privilege from a system; or
  running a preset program that is used to obtain the root privilege, to obtain the system root privilege; or
  downloading and running a preset program that is used to obtain the root privilege, to obtain the system root privilege.
Preferably, obtaining a system root privilege includes:
  obtaining, from the preset virus database, storage path information of an intrusion characteristic file with the root-privileged virus;
  finding the intrusion characteristic file in the smart device according to the obtained storage path information of the intrusion characteristic file; and
  obtaining a system root-privileged process according to the founded intrusion characteristic file.
Preferably, obtaining a system root-privileged process according to the founded intrusion characteristic file includes:
  if the intrusion characteristic file is an executable file that records a scheme for obtaining the root privilege, executing the intrusion characteristic file to obtain the scheme for obtaining the root privilege, and obtaining the root-privileged process based on the scheme for obtaining the root privilege; or if the intrusion characteristic file is a Switch Superuser file, executing the Switch Superuser file to obtain the root-privileged process.
Preferably, executing the intrusion characteristic file to obtain the scheme for obtaining the root privilege, and obtaining the root-privileged process based on the scheme for obtaining the root privilege includes:
  executing the intrusion characteristic file to obtain an intrusion process, so as to cause the intrusion process to automatically trigger a system vulnerability corresponding to the root-privileged virus, and set a process user identity of the intrusion process in system kernel to zero by using the system vulnerability, to obtain the root-privileged process; and
  executing the Switch Superuser file to obtain the root-privileged process includes:
  executing the intrusion characteristic file to generate a root-privileged Switch Superuser process, so as to cause a user using the smart device to have the same root privilege as the root-privileged virus.
Preferably, terminating all processes corresponding to all the detected files with the characteristic of the root-privileged virus includes:
  determining a process identity corresponding to each of the detected files with the characteristic of the root-privileged virus according to a filename of the file with the characteristic of the root-privileged virus; and
  calling a process terminating command to terminate a process corresponding to each process identity.
Preferably, recovering system startup items to a status before the intrusion of the root-privileged virus includes:
  determining storage paths of all the files with the characteristic of the root-privileged virus, and searching an installation recovery list in the system to determine whether the installation recovery list contains storage path information of the file with the characteristic of the root-privileged virus; and if so, calling a preset path deletion command to delete the storage path information of the file with the characteristic of the root-privileged virus from the installation recovery list file, or
  determining whether a file with the characteristic of the root-privileged virus is included in executable files in the system which are executed by default each time the system is started, and if so, deleting the file and recovering an original file corresponding to the deleted file.
Preferably, deleting all the detected files with the characteristic of the root-privileged virus includes:

searching an attribute information table of a file with the characteristic of the root-privileged virus for attribute information denoting that the file is undeletable, and deleting the attribute information; and calling a file deletion command to delete the file with the characteristic of the root-privileged virus.

An embodiment of the present application further discloses an apparatus for removing a root-privileged virus, which is applicable to a smart device. The apparatus includes:

a file determination module, configured to detect, according to a preset virus database, whether the smart device has a file with a characteristic of a root-privileged virus;

a privilege obtaining module, configured to obtain a system root privilege when the file determination module detects a file with the characteristic of the root-privileged virus;

a process terminating module, configure to terminate all processes corresponding to all the detected files with the characteristic of the root-privileged virus;

a startup recovery module, configure to recover system startup items to a status before the intrusion of the root-privileged virus; and a deleting module, configure to delete all the detected files with the characteristic of the root-privileged virus.

Preferably, the privilege obtaining module is configured to:

request the system root privilege from a system; or run a preset program that is used to obtain the root privilege to obtain the system root privilege; or download and run a preset program that is used to obtain the root privilege to obtain the system root privilege.

Preferably, the privilege obtaining module includes:

a path obtaining sub-module, configured to obtain, from the preset virus database, storage path information of an intrusion characteristic file with the root-privileged virus;

a search sub-module, configure to find the intrusion characteristic file in the smart device according to the obtained storage path information of the intrusion characteristic file; and an obtaining sub-module, configure to obtain a system root-privileged process according to the founded intrusion characteristic file.

Preferably, the obtaining sub-module is configured to:

if the intrusion characteristic file is an executable file that records a scheme for obtaining the root privilege by the root-privileged virus, execute the intrusion characteristic file to obtain the scheme for obtaining the root privilege, and obtain the root-privileged process based on the scheme for obtaining the root privilege; or if the intrusion characteristic file is a Switch Superuser file, execute the Switch Superuser file to obtain the root-privileged process.

Preferably, the obtaining sub-module is configured to:

execute the intrusion characteristic file to obtain an intrusion process, so as to cause the intrusion process to automatically trigger a system vulnerability corresponding to the root-privileged virus, and set a process user identity of the intrusion process in system kernel to zero by using the system vulnerability, to obtain the root-privileged process; or execute the intrusion characteristic file to generate a Switch Superuser root-privileged process, so as to cause a user using the smart device to have the same root privilege as the root-privileged virus.

Preferably, the process terminating module includes:

an identity determination sub-module, configured to determine a process identity corresponding to each of the detected files with the characteristic of the root-privileged virus according to a filename of the file with the characteristic of the root-privileged virus; and a command calling sub-module, configured to call a process terminating command to terminate a process corresponding to each process identity.

Preferably, the startup recovery module includes:

a path deleting sub-module, configured to determine storage paths of all the files with the characteristic of the root-privileged virus, and search an installation recovery list in the system to determine whether the installation recovery list contains storage path information of the file with the characteristic of the root-privileged virus; if so, call a preset path deletion command to delete the storage path information of the file with the characteristic of the root-privileged virus from the installation recovery list; or a startup item deleting sub-module, configured to determine whether a file with the characteristic of the root-privileged virus is included in executable files in the system which are executed by default each time the system is started, and if so, delete the file and recovery an original file corresponding to the deleted file.

Preferably, the deleting module includes:

an attribute deleting sub-module, configured to search an attribute information table of a file with the characteristic of the root-privileged virus for attribute information denoting that the file is undeletable, and delete the attribute information; and a file deleting sub-module, configure to call a file deletion command to delete the file with the characteristic of the root-privileged virus.

An embodiment of the present application further discloses an electronic device, including:

a processor, a memory, a communication interface and a bus;

the processor, the memory and the communication interface connect and communicate with each other via the bus;

the memory stores executable program codes;

the processor executes a program corresponding to the executable program codes by reading the executable program codes stored in the memory, to perform the following operations:

detecting, according to a preset virus database, whether a smart device has a file with a characteristic of a root-privileged virus;

obtaining a system root privilege when a file with the characteristic of the root-privileged virus is detected;

terminating all processes corresponding to all the detected files with the characteristic of the root-privileged virus;

recovering system startup items to a status before the intrusion of the root-privileged virus; and deleting all the detected files with the characteristic of the root-privileged virus.

To achieve the above objective, an embodiment of the present application further discloses an application program, which performs the method for removing a root-privileged virus described above when being executed.

To achieve the above objective, an embodiment of the present application further discloses a storage medium for storing an application program, which performs the method for removing a root-privileged virus described above when being executed.

From the above solutions, it can be seen that embodiments of the present application provide a method for removing a root-privileged virus. The method includes: detecting, according to a preset virus database, whether a smart device has a file with a characteristic of a root-privileged virus; obtaining a system root privilege when a file with the characteristic of the root-privileged virus is detected; terminating all processes corresponding to all the detected files with the characteristic of the root-privileged virus; recovering system startup items to a status before the intrusion of the root-privileged virus; and deleting all the detected files with the characteristic of the root-privileged virus. In this embodiment of the present application, the smart device terminates processes for starting the file with the characteristic of the root-privileged virus, and removes the auto-start capability of the file with the characteristic of the root-privileged virus. Therefore, compared with the prior art, the embodiments of the present application enable root-privileged viruses to be killed more thoroughly.

BRIEF DESCRIPTION OF THE DRAWINGS

In order to more clearly; describe the technical solutions of the embodiments of the present application and of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

The present application will be described below in more detail with reference to the specific embodiments.

Figure 1:
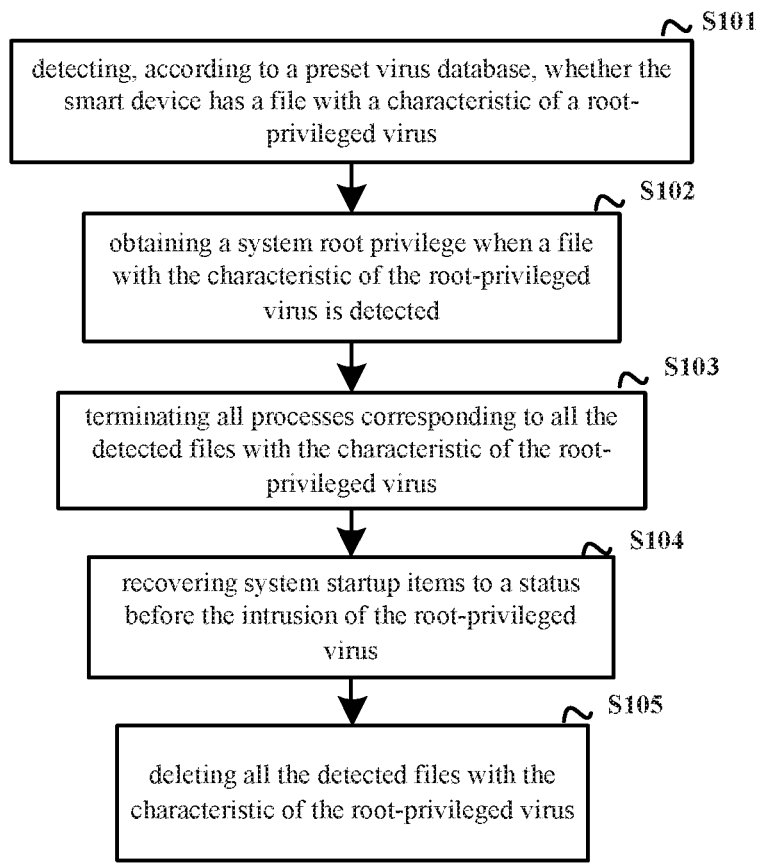
FIG. 1 is a schematic flowchart of a method for removing a root-privileged virus provided in a first embodiment of the present application.

FIG. 1 is a schematic flowchart of a method for removing a root-privileged virus provided in a first embodiment of the present application, which is applicable to a smart device. The method may include the following steps.

S101: detecting, according to a preset virus database, whether the smart device has a file with a characteristic of a root-privileged virus.

According to a characteristic of a root-privileged virus stored in the preset virus database, all the files in the smart device are traversed to determine all files with the characteristic of the root-privileged virus. The files contain executable files with the root-privileged virus.

The characteristic of the root-privileged virus may be a string in a specific filename or a string in a file code. The smart device can traverse all files at all local locations or key locations, and the files contain executable files with the root-privileged virus. A found file with the string is then determined as the file with the root-privileged virus. Through a heuristic virus detection method, a file having the string can be found by traversing all the files at all locations or key locations according to the string. The heuristic virus detection method is the prior art and will not be described in detail in the present application.

S102: obtaining a system root privilege when a file with the characteristic of the root-privileged virus is detected.

The smart device first detects whether a system root privilege can be obtained directly, and if so, directly requests the system root privilege from the system. The specific manner for obtaining the root privilege may be completely the same as the prior art and is not described here. If the system root privilege cannot be obtained directly, the system root privilege can be obtained by running a preset program that is used to obtain the root privilege, or downloading and running a preset program that is used to obtain the root privilege.

S103: terminating all processes corresponding to all the detected files with the characteristic of the root-privileged virus.

A process started by the file with the characteristic of the root-privileged virus has a function of protecting the virus, so the process should also be terminated. Specifically, a process identity corresponding to each of the detected files with the characteristic of the root-privileged virus can be determined according to a filename of the file with the characteristic of the root-privileged virus.

For example, a process identity corresponding to a file with the characteristic of the root-privileged virus can be obtained according to the command "ps|grep filename".

A process terminating command is called to terminate a process corresponding to each process identity.

For example, the command "kill −9 pid" is called to terminate a process corresponding to each process identity, wherein the "pid" is the process identity.

S104: recovering system startup items to a status before the intrusion of the root-privileged virus.

The file with the characteristic of the root-privileged virus may have a capability that it will be restarted when the system is booted by modifying the system startup items, and the capability of the file with the characteristic of the root-privileged virus should be removed to prevent the file with the virus from resurging. Specifically, storage paths of all the files with the characteristic of the root-privileged virus can be determined, and an installation recovery list in the system can be searched to determine whether it contains storage path information of the file with the characteristic of the root-privileged virus; if so, a preset path deletion command is called to delete the storage path information of the file with the characteristic of the root-privileged virus from the installation recovery list.

The installation recovery list may be, as known in the art, a list that records startup items. Any file whose address is recorded in the installation recovery list will be automatically started when the system is restarted. As such, a file with the characteristic of the root-privileged virus is prevented from starting automatically if the address of the file is deleted from the list.

After that, it is also required to determine whether a file with the characteristic of the root-privileged virus is included in executable files in the system which are executed by default each time the system is started. If so, the file is deleted, and the original file corresponding to the deleted file is recovered.

Some executable files may be started by default each time the system is started. A file having the characteristic of the root-privileged virus may be disguised by the virus as an executable file that the system starts by default. For example, the file "debuggerd" under the path "/system/bin" is an executable file that is started by default each time the system is started. A file having the characteristic of the root-privileged virus may be named by the virus as "debuggerd" and stored under the path "/system/bin", while the original "debuggerd" file under the path is renamed by the virus as "debuggerd_xxx". When the system is started, the file named as "debuggerd" (i.e., the file having the characteristic of the root-privileged virus) under the path "/system/bin" will still be started by default. For a same virus, the rule for changing the name of an executable file that is started by default is specific, for example, appending a suffix "_xxx" to the name of the executable file that is started by default.

To cope with the auto-start policy of the file having the characteristic of the root-privileged virus, it may be determined whether a file having the characteristic of the root-privileged virus is included in the executable files in the system which are executed by default each time the system is started. If so, the file is deleted, and the original file corresponding to the deleted file is recovered according to the rule that the virus changes the names of executable files started by default. In this way, one way that the virus is started automatically when the system is started is precluded.

S105: deleting all the detected files with the characteristic of the root-privileged virus.

In this embodiment of the present application, the smart device terminates a process started by the file with the characteristic of the root-privileged virus, and removes the auto-start capability of the file with the characteristic of the root-privileged virus, so that the root-privileged virus is killed more thoroughly.

The file with the characteristic of the root-privileged virus may have an attribute denoting that the file is undeletable. For this case, a preset command for obtaining a file attribute table can be called to obtain a file attribute table of this file, and it is checked, in the file attribute table, whether there is attribute information denoting that the file is undeletable. If so, a preset attribute deletion command is called to delete this attribute information. Based on the method shown in FIG. 1, S105 can include:

searching an attribute information table of a file with the characteristic of the root-privileged virus for attribute information denoting that the file is undeletable, and deleting the attribute information;

calling a file deletion command to delete the file with the characteristic of the root-privileged virus.

Figure 2:
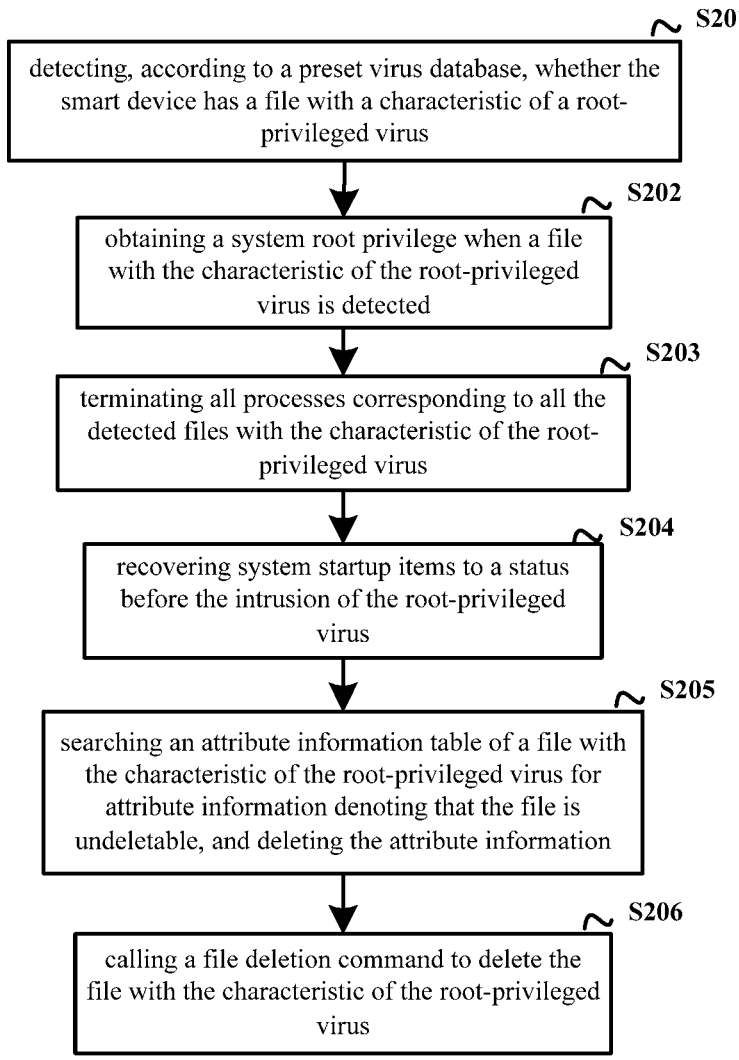
FIG. 2 is a schematic flowchart of a method for removing a root-privileged virus provided in a second embodiment of the present application.

FIG. 2 is a schematic flowchart of a method for removing a root-privileged virus provided in a second embodiment of the present application, which is applicable to a smart device. The method may include the following steps:

S201: detecting, according to a preset virus database, whether the smart device has a file with a characteristic of a root-privileged virus.

S202: obtaining a system root privilege when a file with a characteristic of a root-privileged virus is detected.

S203: terminating all processes corresponding to all the detected files with the characteristic of the root-privileged virus.

S204: recovering system startup items to a status before the intrusion of the root-privileged virus.

S205: searching an attribute information table of a file with the characteristic of the root-privileged virus for attribute information denoting that the file is undeletable, and deleting the attribute information.

For example, an command "lsattr filename" is used to obtain the attribute information table of the obtained file with the characteristic of the root-privileged virus, and it is checked whether a field "-ia" is contained in each piece of attribute information in the attribute information table. If so, this indicates that the file cannot be deleted, and then an command "chattr -ia filename" can be used to delete this attribute information, so as to cause the file with the characteristic of the root-privileged virus to be deleted.

S206: calling a file deletion command to delete the file with the characteristic of the root-privileged virus.

When the attribute, in the file with the characteristic of the root-privileged virus, denoting that the file is undeletable, has been deleted, a file deletion command in the prior art can be used to delete the file, or to delete the catalog where the file is located. For example, "rm filename [file name]" is used to delete the file, and "rm -rf dir [the catalog where the file is located]" is used to delete the catalog where the file is located.

In this embodiment of the present application, the smart device searches an attribute information table of a file with the characteristic of the root-privileged virus for attribute information denoting that the file is undeletable, and deletes this attribute information. In this way, the smart device can call the file deletion command to delete the file with the characteristic of the root-privileged virus.

In another embodiment provided by the present application, the system root privilege can be obtained by using a method for obtaining the system root privilege by the root-privileged virus. Based on the method shown in FIG. 1, S102 may include:

obtaining, from a preset virus database, storage path information of an intrusion characteristic file with the root-privileged virus, when a file with the characteristic of the root-privileged virus is detected;

finding the intrusion characteristic file in the smart device according to the obtained storage path information of the intrusion characteristic file; and obtaining a system root-privileged process according to the founded intrusion characteristic file.

Figure 3:
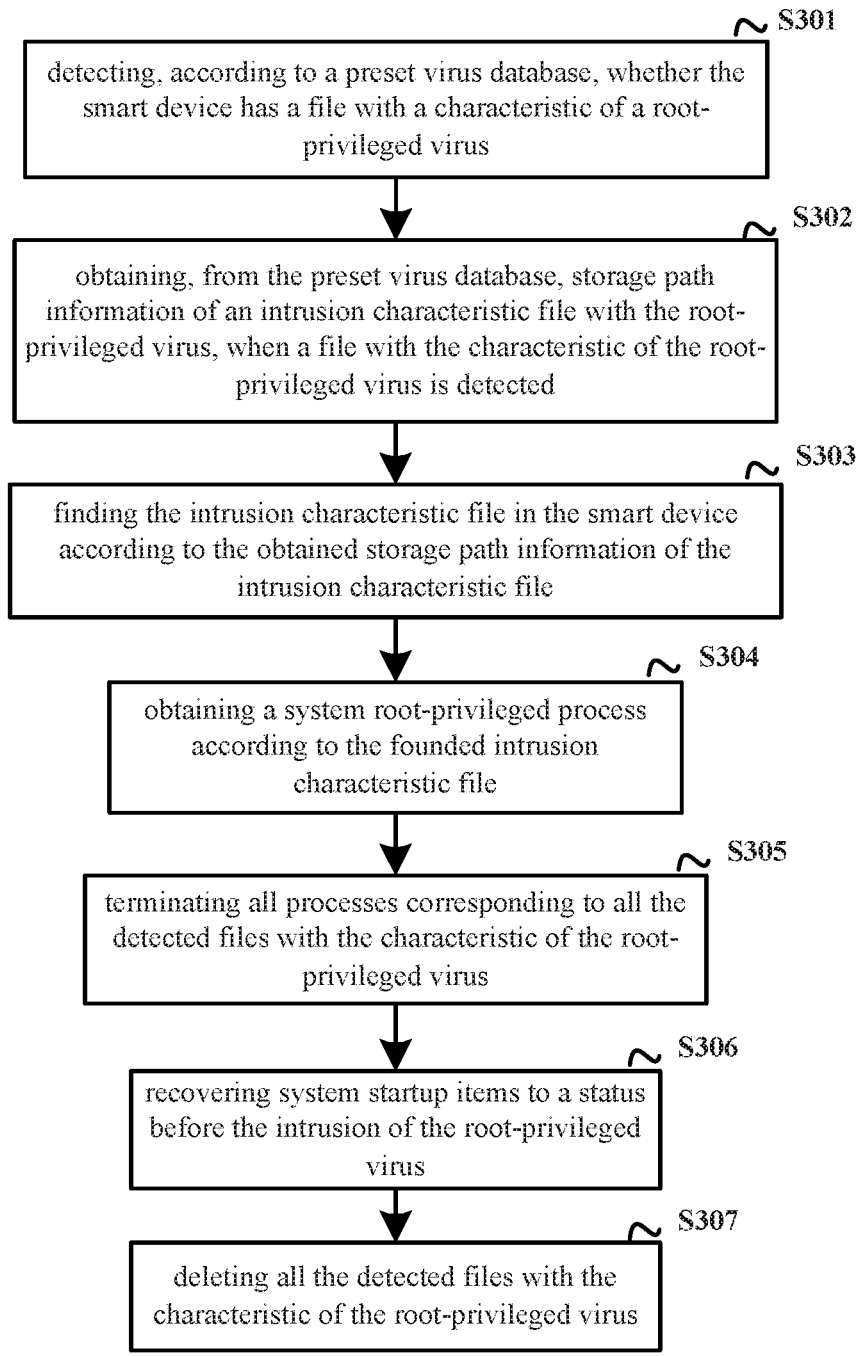
FIG. 3 is a schematic flowchart of a method for removing a root-privileged virus provided in a third embodiment of the present application.

FIG. 3 is a schematic flowchart of a method for removing a root-privileged virus provided in a third embodiment of the present application, which is applicable to a smart device. The method may include the following steps:

S301: detecting, according to a preset virus database, whether the smart device has a file with a characteristic of a root-privileged virus.

S302: obtaining, from a preset virus database, storage path information of an intrusion characteristic file with the root-privileged virus, when a file with the characteristic of the root-privileged virus is detected.

S303: finding the intrusion characteristic file in the smart device according to the obtained storage path information of the intrusion characteristic file.

S304: obtaining a system root-privileged process according to the founded intrusion characteristic file.

There may be two types of the intrusion characteristic files. The first one is an executable file that stores a scheme for obtaining a superuser root privilege of a current smart device by a superuser-privileged virus, wherein the executable file recites a scheme of how this virus obtains the superuser root privilege of the current smart device. The second one is a Switch User (SU) file generated by the root-privileged virus.

Therefore, this step can be implemented in two ways.

If the intrusion characteristic file is an executable file that stores a scheme for obtaining the superuser root privilege of the current smart device by a superuser-privileged virus, the file is executed, which is equivalent to executing a pre-edited script file and can repeat the above step of obtaining the root privilege by the virus to obtain an intrusion process. The intrusion process can automatically trigger a system vulnerability corresponding to the root-privileged virus according to the method for obtaining the root privilege by the root-privileged virus, and set the process user identities GIU and UID of the intrusion process in the system kernel to zero by using the system vulnerability. The process whose GIU and LID are set to 0 is a root-privileged process in the computer operating system.

If the intrusion characteristic file is a SU file generated by the root-privileged virus, the SU file is executed to obtain a root-privileged removing process.

In the prior art, any user who executes an SU file can get the privilege of the user who creates the SU file, because a process having the privilege of the user who creates the SU file will be generated upon execution of the SU file. The user executing the SU file can execute, by means of the process, the commands that could only be executed by the user who creates the SU file. In other words, the user executing the SU file get the privilege of the user who creates the SU file. The creation of a SU file and how it functions are known in the prior art and will be not described in the present application.

S305: terminating all the processes corresponding to all the detected files with the characteristic of the root-privileged virus.

S306: recovering system startup items to a status before the intrusion of the root-privileged virus.

S307: deleting all the detected files with the characteristic of the root-privileged virus.

In the embodiment of the present application, the system root privilege is obtained by using the method for obtaining the system root privilege by the root-privileged virus, improving the speed and success rate of obtaining the root privilege.

Embodiments of the present application provide a method for removing a root-privileged virus which is applicable to a smart device. The smart device detects, according to a present virus database, whether the smart device has a file with a characteristic of a root-privileged virus; obtains a system root privilege when detecting a file with the characteristic of the root-privileged virus; terminates all processes corresponding to all the detected files with the characteristic of the root-privileged virus; recovers system startup items to a status before the intrusion of the root-privileged virus; and deletes all the detected files with the characteristic of the root-privileged virus. In this embodiment of the present application, the smart device terminates a process started by the file with the characteristic of the root-privileged virus, and removes the auto-start capability of the file with the characteristic of the root-privileged virus. Therefore, compared with the prior art, the embodiments of the present application enable root-privileged viruses to be killed more thoroughly.

Figure 4:
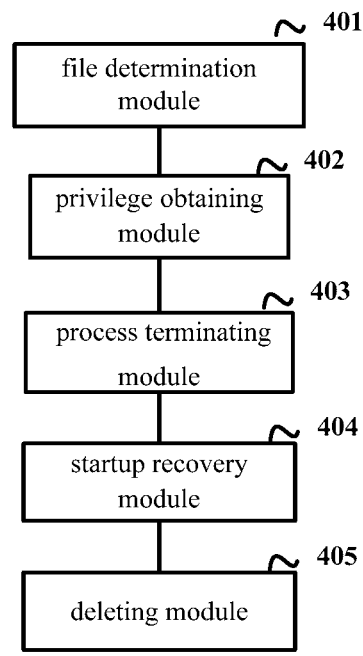
FIG. 4 is a structural schematic diagram of an apparatus for removing a root-privileged virus provided in a first embodiment of the present application.

FIG. 4 is a structural schematic diagram of an apparatus for removing a root-privileged virus provided in a first embodiment of the present application, which is applicable to a smart device. The apparatus can include:

a file determination module 401, configured to detect, according to a preset virus database, whether the smart device has a file with a characteristic of a root-privileged virus;

a privilege obtaining module 402, configured to obtain a system root privilege when the file determination module 401 detects a file with the characteristic of the root-privileged virus;

a process terminating module 403, configure to terminate all processes corresponding to all the detected files with the characteristic of the root-privileged virus;

a startup recovery module 404, configure to recover system startup items to a status before the intrusion of the root-privileged virus;

a deleting module 405, configure to delete all the detected files with the characteristic of the root-privileged virus.

Further, the privilege obtaining module 402 is specifically configured to:

request the system root privilege from the system; or run a preset program that is used to obtain the root privilege to obtain the system root privilege; or download and run a preset program that is used to obtain the root privilege to obtain the system root privilege.

Further, the privilege obtaining module 402 can include:

a path obtaining sub-module (not shown in the figure), configured to obtain, from a preset virus database, storage path information of an intrusion characteristic file with the root-privileged virus;

a search sub-module (not shown in the figure configure to find the intrusion characteristic file in the smart device according to the obtained storage path information of the intrusion characteristic file;

an obtaining sub-module (not shown in the figure), configure to obtain a system root-privileged process according to the founded intrusion characteristic file.

Further, the obtaining sub-module is specifically configured to:

if the intrusion characteristic file is an executable file that records a scheme for obtaining the root privilege by the root-privileged virus, execute the intrusion characteristic file to obtain the scheme for obtaining the root privilege, and obtain the root-privileged process based on the scheme for obtaining the root privilege; or if the intrusion characteristic file is a Switch Superuser file, execute the Switch Superuser file to obtain the root-privileged process.

Further, the obtaining sub-module is specifically configured to:

execute the intrusion characteristic file to obtain an intrusion process, so as to cause the intrusion process to automatically trigger a system vulnerability corresponding to the root-privileged virus, and set a process user identity of the intrusion process in system kernel to zero by using the system vulnerability, to obtain the root-privileged process; or execute the intrusion characteristic file to generate a root-privileged Switch Superuser process, so as to cause a user using the current smart device to have the same root privilege as the root-privileged virus.

Further, the process terminating module 403 can include:

an identity determination sub-module (not shown in the figure), configured to determine a process identity of a process corresponding to each of the detected files with the characteristic of the root-privileged virus according to a filename of the file with the characteristic of the root-privileged virus;

an command calling sub-module (not shown in the figure), configured to call a process terminating command to terminate a process corresponding to each process identity.

Further, the startup recovery module 404 includes:

a path deleting sub-module (not shown in the figure), configured to determine storage paths of all the files with the characteristic of the root-privileged virus, and search an installation recovery list in the system to determine whether it contains storage path information of the file with the characteristic of the root-privileged virus; if so, call a preset path deletion command to delete the storage path information of the file with the characteristic of the root-privileged virus from the installation recovery list;

a startup item deleting sub-module (not shown in the figure), configured to determine whether a file with the characteristic of the root-privileged virus is contained in executable files in the system which are executed by default each time the system is started, and if so, delete the file and recover an original file corresponding to the deleted file.

Further, the deleting module 405 can include:

an attribute deleting sub-module (not shown in the figure), configured to search an attribute information table of a file with the characteristic of the root-privileged virus for attribute information denoting that the file is undeletable, and delete the attribute information; and a file deleting sub-module (not shown in the figure), configure to call a file deletion command to delete the file with the characteristic of the root-privileged virus.

Figure 5:
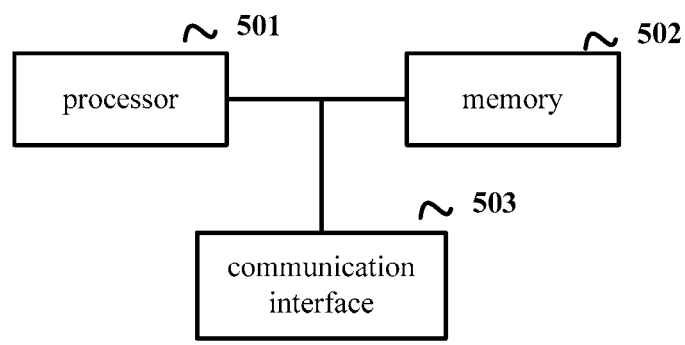
FIG. 5 is a structural schematic diagram of an electronic device provided in an embodiment of the present application.

FIG. 5 is a structural schematic diagram of an electronic device according to an embodiment of the present invention. The electronic device can include:

a processor 501, a memory 502, a communication interface 503 and a bus;

the processor 501, the memory 502 and the communication interface 503 connect and communicate with each other via the bus;

the memory 502 stores executable program codes;

the processor 501 executes a program corresponding to the executable program codes by reading the executable program codes stored in the memory 502 to perform the following operations:

detecting, according to a preset virus database, whether the smart device has a file with a characteristic of a root-privileged virus;

obtaining a system root privilege when a file with the characteristic of the root-privileged virus is detected;

terminating all processes corresponding to all the detected files with the characteristic of the root-privileged virus;

recovering system startup items to a status before the intrusion of the root-privileged virus;

deleting all the detected files with the characteristic of the root-privileged virus.

Embodiments of the present application provide a method and apparatus for removing a root-privileged virus and an electronic device. In the method, a smart device detects, according to a preset virus database, whether the smart device has a file with a characteristic of a root-privileged virus; obtains a system root privilege when detecting a file with the characteristic of the root-privileged virus; terminates all processes corresponding to all the detected files with the characteristic of the root-privileged virus; recovers system startup items to a status before the intrusion of the root-privileged virus; and deletes all the detected files with the characteristic of the root-privileged virus. In this embodiment of the present application, the smart device terminates a process started by the file with the characteristic of the root-privileged virus, and removes the auto-start capability of the file with the characteristic of the root-privileged virus. Therefore, compared with the prior art, the embodiments of the present application enable root-privileged viruses to be killed more thoroughly.

An embodiment of the present application further provides an application program, which performs the method for removing a root-privileged virus when being executed. The method includes:

detecting, according to a preset virus database, whether a smart device has a file with a characteristic of a root-privileged virus;

obtaining a system root privilege when a file with the characteristic of the root-privileged virus is detected;

terminating all processes corresponding to all the detected files with the characteristic of the root-privileged virus;

recovering system startup items to a status before the intrusion of the root-privileged virus;

deleting all the detected files with the characteristic of the root-privileged virus.

In this embodiment of the present application, the smart device terminates processes for starting the file with the characteristic of the root-privileged virus, and removes the auto-start capability of the file with the characteristic of the root-privileged virus. Therefore, compared with the prior art, the embodiments of the present application enable root-privileged viruses to be killed more thoroughly.

An embodiment of the present application further provides a storage medium for storing an application program, which performs the method for removing a root-privileged virus when being executed. The method includes:

detecting, according to a preset virus database, whether a smart device has a file with a characteristic of a root-privileged virus;

obtaining a system root privilege when a file with the characteristic of the root-privileged virus is detected;

terminating all processes corresponding to all the detected files with the characteristic of the root-privileged virus;

recovering system startup items to a status before the intrusion of the root-privileged virus;

deleting all the detected files with the characteristic of the root-privileged virus.

In this embodiment of the present application, the smart device terminates processes for starting the file with the characteristic of the root-privileged virus, and removes the auto-start capability of the file with the characteristic of the root-privileged virus. Therefore, compared with the prior art, the embodiments of the present application enable root-privileged viruses to be killed more thoroughly.

The embodiments of a system, an apparatus and a device are described briefly since they are substantially similar to the embodiment of the method. Related contents can refer to the part that describes the embodiment of the method.

It should be noted that the relationship terms used here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

It can be understood by a person skilled in the art that all or a part of steps in the implementations of the above method can be accomplished by instructing related hardware through programs, which can be stored in a computer-readable storage medium, such as ROM/RAM, a disk, an optical disk, and so on.

The embodiments described above are simply preferable embodiments of the present application, and are not intended to limit the present application. Any modifications, alternatives, improvements, or the like within the spirit and principle of the present application shall be included within the scope of protection of the present application.

What is claimed is:

1. A method for removing a root-privileged virus, which is applicable to a smart device, comprising:
   detecting, according to a preset virus database, whether the smart device has one or more files with a characteristic of the root-privileged virus;
   obtaining a system root privilege when the files with the characteristic of the root-privileged virus are detected;
   terminating all processes corresponding to all the detected files with the characteristic of the root-privileged virus;
   recovering system startup items to a status before an intrusion of the root-privileged virus; and
   deleting all the detected files with the characteristic of the root-privileged virus,
   wherein obtaining the system root privilege comprises:
   obtaining, from the preset virus database, storage path information of an intrusion characteristic file with the root-privileged virus;
   finding the intrusion characteristic file in the smart device according to the obtained storage path information of the intrusion characteristic file; and
   if the found intrusion characteristic file is an executable file that records a scheme for obtaining the system root privilege by the root-privileged virus, executing the found intrusion characteristic file to obtain the scheme for obtaining the system root privilege, and obtaining a system root-privileged process based on the scheme for obtaining the system root privilege; or if the found intrusion characteristic file is a Switch Superuser file generated by the root-privileged virus, executing the Switch Superuser file to obtain the system root-privileged process,
   wherein executing the found intrusion characteristic file to obtain the scheme for obtaining the system root privilege, and obtaining the system root-privileged process based on the scheme for obtaining the system root privilege comprises:
   executing the found intrusion characteristic file to obtain an intrusion process, so as to cause the intrusion process to automatically trigger a system vulnerability corresponding to the root-privileged virus, and set a process user identity of the intrusion process in system kernel to zero by using the system vulnerability, to obtain the system root-privileged process; and
   executing the Switch Superuser file to obtain the system root-privileged process comprises:
   executing the found intrusion characteristic file to generate a root-privileged Switch Superuser process, so as to cause a user using the smart device to have the same system root privilege as the root-privileged virus,
   wherein deleting all the detected files with the characteristic of the root-privileged virus comprises:
   searching an attribute information table of the files with the characteristic of the root-privileged virus for attribute information denoting that the files are undeletable, and deleting the attribute information; and
   calling a file deletion command to delete the files with the characteristic of the root-privileged virus.

2. The method of claim 1, wherein obtaining a system root privilege comprises:
   requesting the system root privilege from a system; or
   running a preset program that is used to obtain the system root privilege, to obtain the system root privilege; or
   downloading and running a preset program that is used to obtain the system root privilege, to obtain the system root privilege.

3. The method of claim 1, wherein terminating all processes corresponding to all the detected files with the characteristic of the root-privileged virus comprises:
   determining a process identity corresponding to each of the detected files with the characteristic of the root-privileged virus according to a filename of the file with the characteristic of the root-privileged virus; and
   calling a process terminating command to terminate a process corresponding to each process identity.

4. The method of claim 1, wherein recovering the system startup items to the status before the intrusion of the root-privileged virus comprises:
   determining storage paths of all the files with the characteristic of the root-privileged virus, and searching an installation recovery list in a system to determine whether the installation recovery list contains storage path information of the files with the characteristic of the root-privileged virus; and if so, calling a preset path deletion command to delete the storage path information of the files with the characteristic of the root-privileged virus from the installation recovery list file, or
   determining whether a file with the characteristic of the root-privileged virus is included in executable files in the system which are executed by default each time the system is started, and if so, deleting the file and recovering an original file corresponding to the deleted file.

5. An electronic device, comprising:
   a processor, a memory, a communication interface and a bus;
   the processor, the memory and the communication interface connect and communicate with each other via the bus;
   the memory stores executable program codes;
   the processor executes a program corresponding to the executable program codes by reading the executable program codes stored in the memory, to perform the following operations:
   detecting, according to a preset virus database, whether a smart device has one or more files with a characteristic of the root-privileged virus;
   obtaining a system root privilege when the files with the characteristic of the root-privileged virus are detected;
   terminating all processes corresponding to all the detected files with the characteristic of the root-privileged virus;
   recovering system startup items to a status before an intrusion of the root-privileged virus; and deleting all the detected files with the characteristic of the root-privileged virus,
wherein the operation of obtaining a system root privilege comprises:
obtaining, from the preset virus database, storage path information of an intrusion characteristic file with the root-privileged virus;
finding the intrusion characteristic file in the smart device according to the obtained storage path information of the intrusion characteristic file; and
if the found intrusion characteristic file is an executable file that records a scheme for obtaining the system root privilege by the root-privileged virus, executing the found intrusion characteristic file to obtain the scheme for obtaining the system root privilege, and obtaining a system root-privileged process based on the scheme for obtaining the system root privilege; or if the found intrusion characteristic file is a Switch Superuser file generated by the root-privileged virus, executing the Switch Superuser file to obtain the system root-privileged process,
wherein executing the found intrusion characteristic file to obtain the scheme for obtaining the system root privilege, and obtaining the system root-privileged process based on the scheme for obtaining the system root privilege comprises:
executing the found intrusion characteristic file to obtain an intrusion process, so as to cause the intrusion process to automatically trigger a system vulnerability corresponding to the root-privileged virus, and set a process user identity of the intrusion process in system kernel to zero by using the system vulnerability, to obtain the system root-privileged process; and
executing the Switch Superuser file to obtain the system root-privileged process comprises:
executing the found intrusion characteristic file to generate a root-privileged Switch Superuser process, so as to cause a user using the smart device to have the same system root privilege as the root-privileged virus,
wherein deleting all the detected files with the characteristic of the root-privileged virus comprises:
searching an attribute information table of the files with the characteristic of the root-privileged virus for attribute information denoting that the files are undeletable, and deleting the attribute information; and
calling a file deletion command to delete the files with the characteristic of the root-privileged virus.

6. A non-transitory storage medium having stored thereon an application program, wherein the application program is executed by a processor to cause the processor to perform operations of:
detecting, according to a preset virus database, whether a smart device has one or more files with a characteristic of the root-privileged virus;
obtaining a system root privilege when the files with the characteristic of the root-privileged virus are detected;
terminating all processes corresponding to all the detected files with the characteristic of the root-privileged virus;
recovering system startup items to a status before an intrusion of the root-privileged virus; and
deleting all the detected files with the characteristic of the root-privileged virus,
wherein the operation of obtaining a system root privilege comprises:
obtaining, from the preset virus database, storage path information of an intrusion characteristic file with the root-privileged virus;
finding the intrusion characteristic file in the smart device according to the obtained storage path information of the intrusion characteristic file; and
if the found intrusion characteristic file is an executable file that records a scheme for obtaining the system root privilege by the root-privileged virus, executing the found intrusion characteristic file to obtain the scheme for obtaining the system root privilege, and obtaining a system root-privileged process based on the scheme for obtaining the system root privilege; or if the found intrusion characteristic file is a Switch Superuser file generated by the root-privileged virus, executing the Switch Superuser file to obtain the system root-privileged process,
wherein executing the found intrusion characteristic file to obtain the scheme for obtaining the system root privilege, and obtaining the system root-privileged process based on the scheme for obtaining the system root privilege comprises:
executing the found intrusion characteristic file to obtain an intrusion process, so as to cause the intrusion process to automatically trigger a system vulnerability corresponding to the root-privileged virus, and set a process user identity of the intrusion process in system kernel to zero by using the system vulnerability, to obtain the system root-privileged process; and
executing the Switch Superuser file to obtain the system root-privileged process comprises:
executing the found intrusion characteristic file to generate a root-privileged Switch Superuser process, so as to cause a user using the smart device to have the same system root privilege as the root-privileged virus,
wherein deleting all the detected files with the characteristic of the root-privileged virus comprises:
searching an attribute information table of the files with the characteristic of the root-privileged virus for attribute information denoting that the files are undeletable, and deleting the attribute information; and
calling a file deletion command to delete the files with the characteristic of the root-privileged virus.

7. The electronic device of claim 5, wherein the processor is further caused to perform operations of:
requesting the system root privilege from a system; or
running a preset program that is used to obtain the system root privilege, to obtain the system root privilege; or
downloading and running a preset program that is used to obtain the system root privilege, to obtain the system root privilege.

8. The electronic device of claim 5, wherein the processor is further caused to perform operations of:
determining a process identity corresponding to each of the detected files with the characteristic of the root-privileged virus according to a filename of the file with the characteristic of the root-privileged virus; and
calling a process terminating command to terminate a process corresponding to each process identity.

9. The electronic device of claim 5, wherein the processor is further caused to perform operations of:
determining storage paths of all the files with the characteristic of the root-privileged virus, and searching an installation recovery list in a system to determine whether the installation recovery list contains storage path information of the file with the characteristic of the root-privileged virus; and if so, calling a preset path deletion command to delete the storage path information of the file with the characteristic of the root-privileged virus from the installation recovery list file, or determining whether a file with the characteristic of the root-privileged virus is included in executable files in the system which are executed by default each time the system is started, and if so, deleting the file and recovering an original file corresponding to the deleted file.

* * * * *